US011544723B2

(12) United States Patent
Battaille et al.

(10) Patent No.: US 11,544,723 B2
(45) Date of Patent: Jan. 3, 2023

(54) COMPUTER-IMPLEMENTED METHOD FOR CUSTOMISING INTERACTIVITY

(71) Applicant: ALTERFACE HOLDINGS, Wavre (BE)

(72) Inventors: Stephane Battaille, Brussels (BE); Laurence Beckers, Gembloux (BE); Etienne Sainton, Schaerbeek (BE); Benjamin Walravens, Woluwé St Lambert (BE)

(73) Assignee: ALTERFACE HOLDINGS, Wavre (BE)

( * ) Notice: Subject to any disclaimer, the term of this patent is extended or adjusted under 35 U.S.C. 154(b) by 321 days.

(21) Appl. No.: 16/648,539

(22) PCT Filed: Sep. 22, 2017

(86) PCT No.: PCT/EP2017/074127
§ 371 (c)(1),
(2) Date: Mar. 18, 2020

(87) PCT Pub. No.: WO2019/057300
PCT Pub. Date: Mar. 28, 2019

(65) Prior Publication Data
US 2020/0219113 A1 Jul. 9, 2020

(51) Int. Cl.
A63G 31/00 (2006.01)
G06Q 30/02 (2012.01)
(Continued)

(52) U.S. Cl.
CPC ......... G06Q 30/0201 (2013.01); A63G 31/00 (2013.01); G06F 3/011 (2013.01); G07C 9/10 (2020.01)

(58) Field of Classification Search
CPC ............ G06F 3/011; G07C 9/10; A63G 31/00
See application file for complete search history.

(56) References Cited

U.S. PATENT DOCUMENTS 5,566,327 A * 10/1996 Sehr ................. G06Q 20/40145
6,539,393 B1 * 3/2003 Kabala ................... G06Q 10/06
707/999.102
(Continued)

FOREIGN PATENT DOCUMENTS

WO 97/18534 A1 11/1996

OTHER PUBLICATIONS

International Search Report and Written Opinion dated Nov. 29, 2017, issued in corresponding International Application No. PCT/EP2017/074127, filed Sep. 22, 2017, 9 pages.

Primary Examiner — David L Lewis
Assistant Examiner — Shauna-Kay Hall
(74) Attorney, Agent, or Firm — Christensen O'Connor Johnson Kindness PLLC

(57) ABSTRACT

The present disclosure relates to a method for providing interactivity between an electronic system and a first user visiting a facility such as, for example, an amusement park. The first user is identified and provided with a first input mobile element. The first input mobile element interacts with input fixed elements. The interaction results in a feedback that is provided, through output means to the first user or his first input mobile element. The feedback is preferably determined according to the history of the first user.

18 Claims, 4 Drawing Sheets

Figure 1:
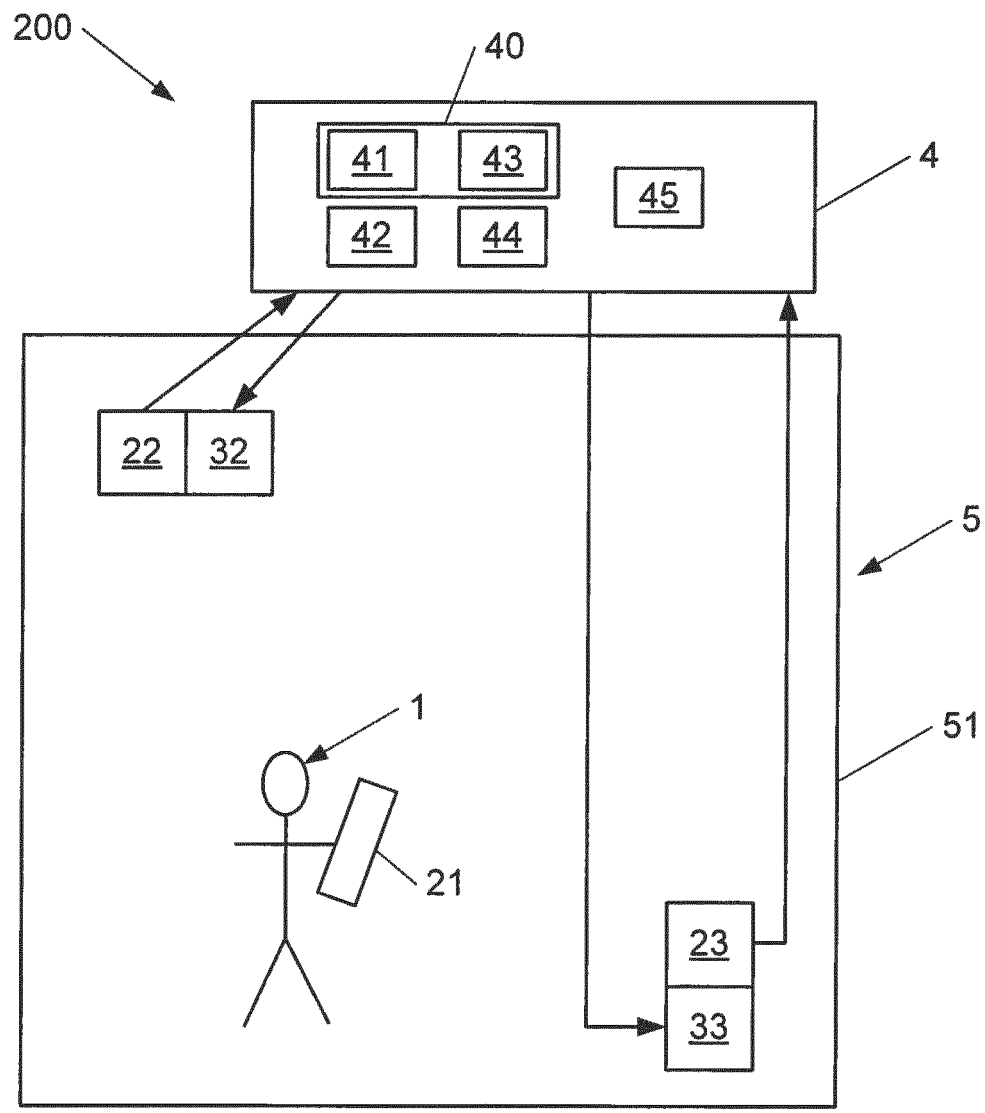

(51) Int. Cl.
*G07C 9/10* (2020.01)
*G06F 3/01* (2006.01)

(56) References Cited

U.S. PATENT DOCUMENTS

| | | | | |
|---|---|---|---|---|
| 7,137,899 B2* | 11/2006 | Hiei | ............... | G06Q 10/02 |
| | | | | 472/136 |
| 7,541,926 B2* | 6/2009 | Dugan | ............... | G08B 13/2462 |
| | | | | 340/8.1 |
| 2003/0093167 A1* | 5/2003 | Sim | ............... | G07C 11/00 |
| | | | | 705/5 |
| 2005/0045710 A1* | 3/2005 | Burke | ............... | G07F 7/025 |
| | | | | 235/375 |
| 2009/0063205 A1* | 3/2009 | Shibasaki | ............... | G06Q 10/02 |
| | | | | 705/5 |
| 2009/0267728 A1 | 10/2009 | Mayrand | | |
| 2010/0308964 A1* | 12/2010 | Ackley | ............... | G06K 19/07327 |
| | | | | 340/10.1 |
| 2013/0045804 A1* | 2/2013 | Ruke | ............... | A63F 13/79 |
| | | | | 463/40 |
| 2017/0169449 A1* | 6/2017 | Heaven | ............... | G06Q 30/0203 |
| 2019/0282908 A1* | 9/2019 | Kim | ............... | H04W 4/027 |

* cited by examiner

COMPUTER-IMPLEMENTED METHOD FOR CUSTOMISING INTERACTIVITY

CROSS-REFERENCE TO RELATED APPLICATION

This application is a National Stage of International Application No. PCT/EP2017/074127, filed Sep. 22, 2017, the entire disclosure of which is hereby incorporated by reference herein for all purposes.

FIELD OF THE INVENTION

The present invention relates to a method and a system to provide non-linear interactivity in a facility.

BACKGROUND OF THE INVENTION

Interactive dark rides are known. They are often present in amusement park. In a typical interactive dark ride, a user is provided with a mobile input element, like a gun. Then, the user is carried through a number of scenes where he can shoot on targets with the gun.

If the user visits a second time in the interactive dark ride, he is again provided with a gun and carried through the same scenes.

After a few visits in the dark ride, the user is not surprised anymore and his interest for the dark ride strongly drops.

SUMMARY OF THE INVENTION

It is an object of the present invention to provide a solution for increasing the interest of users visiting several times a facility.

An object of the invention is a method for providing interactivity between an electronic system and a first user visiting a facility, for example an amusement park, and comprising:
providing a first input fixed element in the facility,
providing a first output means in the facility,
providing a determination means comprising a determination so are and a memory,
wherein, at each of a first visit and a second visit of the first user in the facility:
  a first input mobile element is associated with the first user (1), the first input mobile element being able to move with the first user,
  the first input fixed element detects a first interaction between the first input mobile element and the first input fixed element,
  the first input fixed element sends an information related to the first interaction to the determination means,
  the determination so are determines a feedback information based on the information related to the first interaction,
  the determination means sends the feedback information to the first output means, and
  the first output means provides a feedback based on the feedback information.

Preferably, the first user is identified during each of his visits of the facility, the memory stores the information related to the first interaction detected during the first visit and the feedback information determined during the second visit is based on the information related to the first interaction detected during the first visit.

Preferably, the feedback information determined during the second visit is based on information related to at least one interaction detected during the second visit.

A first way to increase the interest of a user during a second visit of the facility is to store information about what the user has done during his first visit and to adapt the feedback to this stored information.

For example, if the user has performed some actions with his input mobile element during his first visit, these actions may influence the feedback received by the user during his second visit.

It is also possible that the first interaction is a log in. When the same user logs in during his second visit, the method according to the invention will then make possible that the second visit of the user will be different from the first visit.

Preferably, the first interaction triggers a recognition of the first user and/or of the first input mobile element.

The storage of information from the current visit and previous visit(s) can be called a user historic data or a record of the previous visit(s).

The visit of the facility preferably starts when the user moves inside the facility through the physical barrier around the facility. The visit of the facility preferably ends when the user moves outside the facility through the physical barrier around the facility.

The second visit may starts as soon as the first visit is over.

In an example, the facility is an amusement park, and each visit corresponds to one day in the amusement park. For example, the memory may be able to store information related to a user for one year.

In another example, the facility is a dark ride, and each visit is a ride. For example, the memory may be able to store information related to a user for one day or for one year.

In another example, the facility is a set of locations. It can be for example a chain of museums or a chain of attraction parks. Preferably, each location is physically delimited, for example by a physical barrier.

The method according to the invention may be called "non-linear interaction" since the experience of the first user may be adapted at each visit.

Preferably, the determination means records information about all the interactions performed by the first input mobile element and/or the first user associated with the input mobile element, in such a way that the determination of the feedback information takes into account at least two of, and preferably all of, the interactions previously performed by the first input mobile element and/or the first user.

The identification of the first user may for example be performed by a unique user ID. It may be performed by an login word or code and preferably a password.

Preferably, because of the association between the first user and the first input mobile element each interaction of the first input mobile element is linked to the first user in the determination means.

Preferably, the first input mobile element has a unique ID. Preferably, each first input mobile element has a unique ID.

The memory can be any electronic storage means.

Preferably, the memory stores the information related to the first interaction detected during the first visit in relation with the first user.

The first mobile element can be different during the two visits. It can for example be a sword during the first visit and a magic wand during the second The first mobile element may be provided to the first user when he enters the facility. The input mobile element associated with the user can be the same at every visit or the user. It is the case for example if the user buys the magic wand that forms the input mobile element.

The first output means may provide the feedback to the first user and/or to the first input mobile element associated with the first user. Preferably, the feedback is able to influence the experience that the first user gets in the facility.

The association of the first input mobile element and the first user might be performed before the entrance of the user in the facility. The association of the first input mobile element and the first user might be performed only once for both visits in the facility, for example if the user buys the first input mobile element.

The first input fixed element may be a unit located at a given place in the facility. It can also be a plurality of units, each unit being at a different place in the facility. The first input fixed element may be different during the first and the second visits.

The first output means may be a unit located at a given place in the facility. It can also be a plurality of units, each unit being at a difference place in the facility. The output means may be different during the first and the second visits.

Preferably, the first input fixed element is immobile within the facility. The first output means may be mobile or immobile in the facility.

Preferably, the input fixed element is an electronic element. Preferably, the input mobile element is an electronic element. Preferably, the output means is an electronic output means. Preferably, the determination means is an electronic determination means. Preferably, a sending interaction uses electronic means like wired or wireless electronic communication means.

In the frame of the present document, an RFID device, even a passive RFID device, is an electronic device.

In the frame of the present document, a "visit" is the time spent by a user within the facility.

In the frame of the present document, a "facility" can be for example an amusement park, a building, a room or a plurality of rooms, an attraction, a ride, a dark ride, a maze, a walkthrough, a water park, a museum or a set of several of those. The facility is preferably geographically delimited, for example by physical barrier like a fence and/or a wall. If the facility comprises several locations, the physical barrier has to be understood as the collection of physical barriers of all the locations.

In the frame of the present document, an "input mobile element" can for example comprise at least one of: a GPS, an electronic toy representing a weapon, a pistol or a magic wand, a part of the user like his hands, an RFID identifier, an RFID wristband, a light source, a laser, a device comprising a button, a vehicle carrying the user or a combination thereof, a reflector suitable to reflect a beam of electromagnetic waves like a laser beam. Preferably, the input mobile element is passive, i.e., it does not comprise any battery.

In the frame of the present document, an "input fixed element" can for example comprise at least one of: a camera, a sensor, a motion sensor, a 3D camera, a camera with motion recognition means, an RFID reader, The input fixed element may comprise a plurality of elements distributed in the facility. The input fixed element may be a unit located at a given place in the facility.

The interaction between the input mobile element and the input fixed element can be of any type, for example any type currently used in interactive dark rides.

In the frame of the present document, an "output means" can for example comprise at least one of: a screen, a display, an animatronic, a robot, a projection system, an electronic system managing vehicle moves, a vehicle or an actor.

In an embodiment of the invention, the input fixed element and the output means are arranged in a station. The station can for example be an electronic unit.

In the frame of the present document, a "determination means" can for example comprise at least one of: a memory, a computer, a server, or a plurality of them.

In the frame of the present document, an "interaction" can for example comprise at least one of: a log in, a pointing, a performance of a motion, a shooting.

Preferably, the interaction with the first input fixed element is performed when the user willingly makes an action with the input mobile element, for example when the user touches the input mobile element or moves at least part of the input mobile element in a given way.

An interaction may be associated with a type of input fixed element. For example, a shooting interaction may be associated with an input fixed element that is able to detect such a shooting.

In the frame of the present document, a "feedback" can for example comprise at least one of: displaying a text, an image and/or a video, diffusing an audio message, sending an electronic message requesting a vehicle to move to a given target location.

The feedback preferably indicates to the first user and/or the first input mobile element a next interaction to be realized.

In the frame of the present document, a "location" is the place of the user and its input mobile element.

In the frame of the present document, a "target location" is the place of the user and its input mobile element are sent by the feedback. The feedback information may include a target location.

Preferably, an input fixed element and a first output means are located at each target location.

The feedback information is preferably determined also using a story line.

In the frame of the present document, a "story line" can for example comprise at least one of: a compulsory interaction, an optional interaction, a compulsory target location, an optional target location. Preferably, the story line is managed by the determination means. The story line can for example comprise a decision tree wherein a decision between several options is taken based on at least one of: the interaction(s) performed by the input fixed element, the location of the input mobile element, previous target location(s) of the input mobile element and the timing. The story line can also for example comprise a list of chained interactions that the user has to follow in a given order.

In an embodiment of the invention, the method comprises a step wherein the first user enters information on a web platform that is part of an electronic system according to the invention. The first user can for example modifies his profile and/or his historic database on the web platform.

In an embodiment of the invention, the first interaction is consciously realized by the user with the first input mobile element.

In an embodiment of the invention, a second user visits the facility and is associated with a second input mobile element able to move with him and:
  the first input fixed element detects a second interaction between the second input mobile element and the first input fixed element,
  the first input fixed element sends an information related to the second interaction to the determination means, the determination so are determines the feedback information based also on the information related to the second interaction, and the determination means sends the feedback information to the first output means.

The first output means is then able to influence the experience of the first user in the facility based on the interaction due to the second user.

In other words, the feedback information is based on interactions performed by at least two input mobile elements.

This is another way to increase the interest of users visiting several times a facility. The experience during the two visits are different since the interactions of other users are different.

For example, if the first and the second users are within the same vehicle in a dark ride, each user having a gun, the shooting scores of both users may influence the motion of the vehicle. In this example, the guns are the first and the second input mobile elements and the vehicle is the first output means.

In an embodiment of the invention, the feedback information is determined based on a size of a queue at entrance of the facility.

For example, the feedback information may be such that the first user will stay shorter within the facility if the queue is long than if the queue is short. The user may be sent faster to an exit space if the queue is long.

In an embodiment of the invention, the first input fixed element and the first output means are comprised in a first station and further comprising the step of providing a second station comprising a second input fixed element and a second output means and further comprising the steps of the second input fixed element detects a subsequent interaction between the first input mobile element and the second input fixed element, and sends an information related to the subsequent interaction to the determination means, the determination so are determines a second feedback information based on the information related to the first interaction and on the information related to the subsequent interaction, the determination means sends the second feedback information to the second output means, and the second output means provides a second feedback based on the second feedback information.

In other words, during any of the first and the second visits, the second feedback may take into account two interactions (the first interaction and the subsequent interaction) that did not occur at the same place within the facility. This is another way to increase the interest of users visiting several times a facility. It is also possible that the first interaction occurs during the first visit of the facility and the subsequent interaction occurs during the second visit of the facility.

A station may comprise a housing for the input fixed element and the output means. The elements of a station are preferably located at less than one meter from each other.

In an embodiment of the invention, the second feedback information comprises information about a target location and the second feedback information relates at least partially to the target location.

This is the case for example when the second station is a dispatching station that sends user to various target locations where first stations are located. Preferably, there is no information related to a target location provided in the first stations.

An example is the following. The user is provided with a first input mobile element which is an RFID tag that makes possible for the user to log in. The user goes to the dispatching station (second station) and logs in.

He gets there the information about the first target location. He goes to the first target location where the first station is. He logs in (first interaction) and possibly performs an additional first interaction at the first target location. He goes back to the dispatching station. He logs in (subsequent interaction) and gets a next target location (second feedback). The determination of the next target location takes into account the fact that the user has logged in at the first station and the fact that the user has later logged in at the second station.

In an embodiment of the invention, the first user chooses a profile and the feedback information is based on the profile.

For example the user may decide to be a wizard the feedback information is that his next interaction is to cast a spell.

In an embodiment of the invention, the determination software determines a target location and the feedback information relates at least partially to the target location.

The user and its input mobile element are thus sent to this target location.

Preferably, the determination means store a list of possible target locations, with the location of the possible target locations and possibly with interactions performable at each possible target location.

Preferably, the determination software calls a dispatcher software for the determination of the target location In an embodiment of the invention, the determination means stores a closure information indicating the closure of a possible target location and the determination software determines the target location based on the closure information, in such a way that the target location differs from the closed possible target location.

The closure information can be updated once the possible target location is again suitable for visits.

In an embodiment of the invention, the determination software determines the target location in order to distribute the users within the facility.

For example, the target location can be determined in such a way to distribute the users approximately uniformly within the facility and/or to avoid more than a given number of users at any location. It provides a better balance for the user load within the facility or amongst the stations.

If the facility comprises a number of rooms, the determination software may determine the target location in such a way that there less than a given number of users or input mobile elements in a given room.

In an embodiment of the invention, the determination software determines the target location based on previous target locations, in such a way that each target location is visited by a user only once, only once in a predetermined duration or only once per visit of the facility.

It is another way to increase the interest of users visiting several times a facility. If the condition is that the first user can visit each target location only once, the first user will not visit the same target location when he comes back to the facility for the second visit.

In an embodiment of the invention, the determination software determines the target location based on the current location, in such a way that the distance between the current location and the target location is below a given threshold.

If the first user walks between target locations, it is more comfortable if the walk is short. If the first user uses a vehicle between target locations, it is more efficient if the distance between two following stations is short.

In an embodiment of the invention, the determination software determines the feedback information based on a timing.

In the frame of the present document, a "timing" can for example be the time of the day or the time spent since a start step of the input mobile element. For example, an event can be scheduled at a given time and this event will influence any feedback information within a given duration. The timing may comprise a timed script.

In an embodiment of the invention, the determination software determines the feedback information based also on a constraint.

A constraint can comprise, for example, at least one of: an interdiction, an obligation, a avoidance or a preference.

An interdiction is a constraint that forbids something. The interdiction is preferably that the feedback avoids the first user to do something or to go to a target location. For example, it avoids to send the first user to a closed target location or it avoids that two users go to the same target location.

An obligation is a constraint that has to be fulfilled. It can be that at least one user has to go to a given target location and that each vehicle needs to visit each room of the dark ride.

An avoidance is a constraint that preferably avoids something. For example, users should not walk too much.

A preference is a constraint that preferably induces something. For example, a maximum of users should be gathered at a given target location because an impressive event is scheduled there in the timing or users should be move to a given side of the facility because waiting times are low there.

The constraints can evolve during the day or from external input such as the planning of the facility or the waiting time of attractions.

In an embodiment of the invention, the first input mobile element comprises a vehicle that vehicles the first user within the facility.

For example, the first user can sit in the vehicle. An interaction between the vehicle and the first input fixed element may result in the detection of the position of the vehicle. This position is the information related to the first interaction.

The vehicle is preferably a trackless vehicle.

In an embodiment of the invention, the first input mobile element further comprises a device actionable by the first user.

For example, the first input mobile element may comprise a button.

For example, the vehicle may be equipped with guns that are devices actionable by the users.

In an embodiment of the invention, the facility comprises a dispatching space, a plurality of additional spaces and the determination so are determines a target location in such a way that at least one of the following conditions is fulfilled:
the target location is one of the additional spaces,
during a visit, all the additional spaces are visited by the first user,
during a visit, none of the additional spaces is visited more than once by the first user,
there is at maximum a given number of input mobile elements in each of the additional spaces, and
the additional spaces are visited in different order during the first and the second visits of the first user.

Preferably, all the conditions should be fulfilled. These conditions can for example apply when the first input mobile element comprises a vehicle.

In the frame of the present document, a "space" can for example be a room. Preferably, the facility comprises a plurality of spaces.

The dispatching space is preferably a central space which has direct communication with all additional spaces.

The invention also relates to an electronic system comprising:
a first input fixed element,
a first output means,
a determination means comprising a determination software, and a memory, and
a first input mobile element,
configured for carrying out a method according to any embodiment of the invention.

At least part of the electronic system is located in the facility. However, the determination means does not have to be in the facility, and the first input mobile element may move inside and outside the facility.

The invention also relates to a computer program comprising instructions to cause a system according to any embodiment of the invention to execute a method according to any embodiment of the invention.

The computer program may be distributed amongst the parts of the system.

The invention also relates to a computer-readable medium having stored thereon a computer program according to any embodiment of the invention.

The computer-readable medium may be distributed amongst the parts of the system.

RIEF DESCRIPTION OF THE FIGURES

Figure 2:
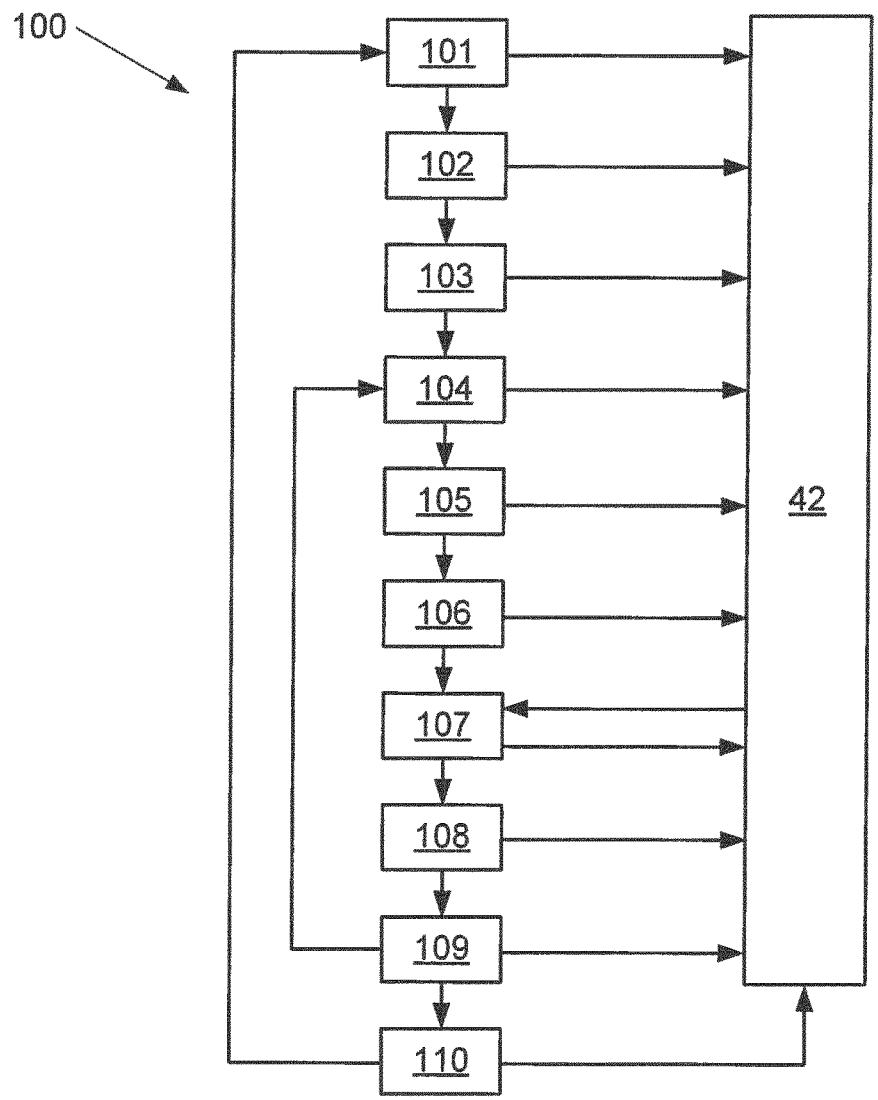
Figure 3:
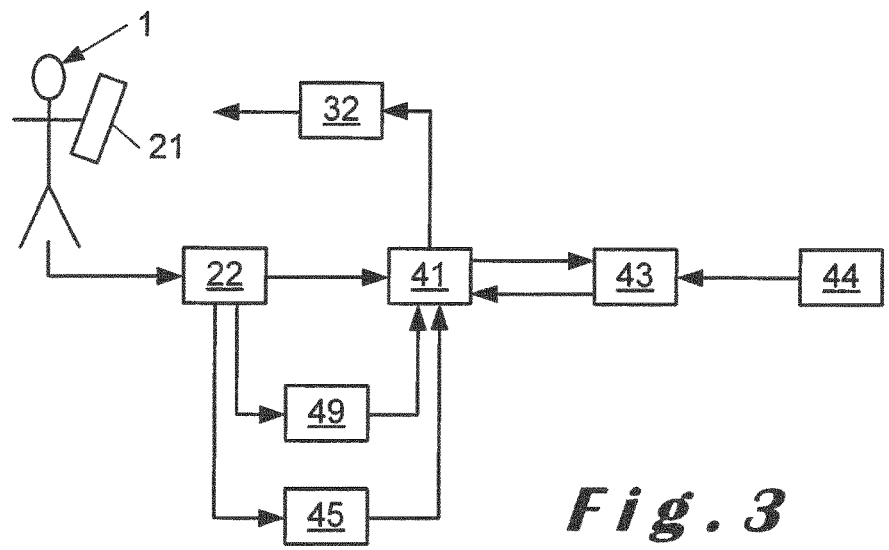
Figure 4:
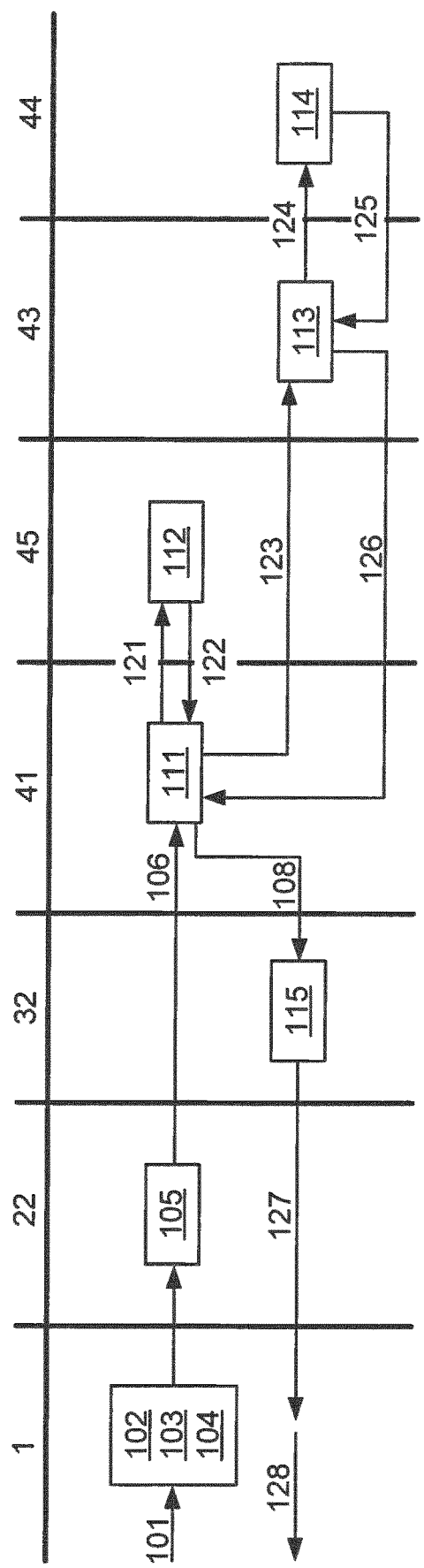
Figure 5:
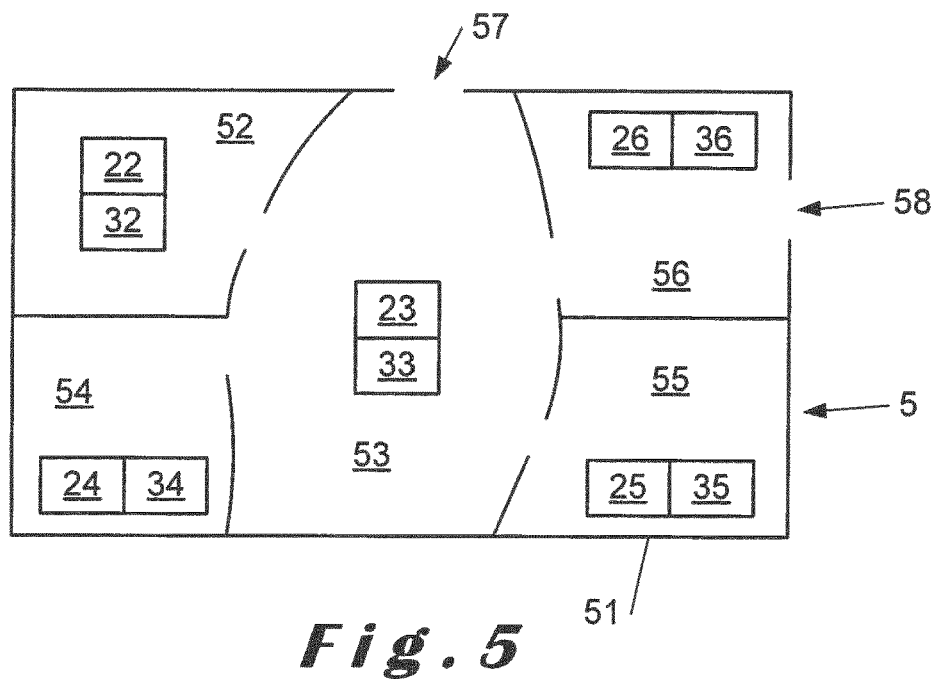
Figure 6:
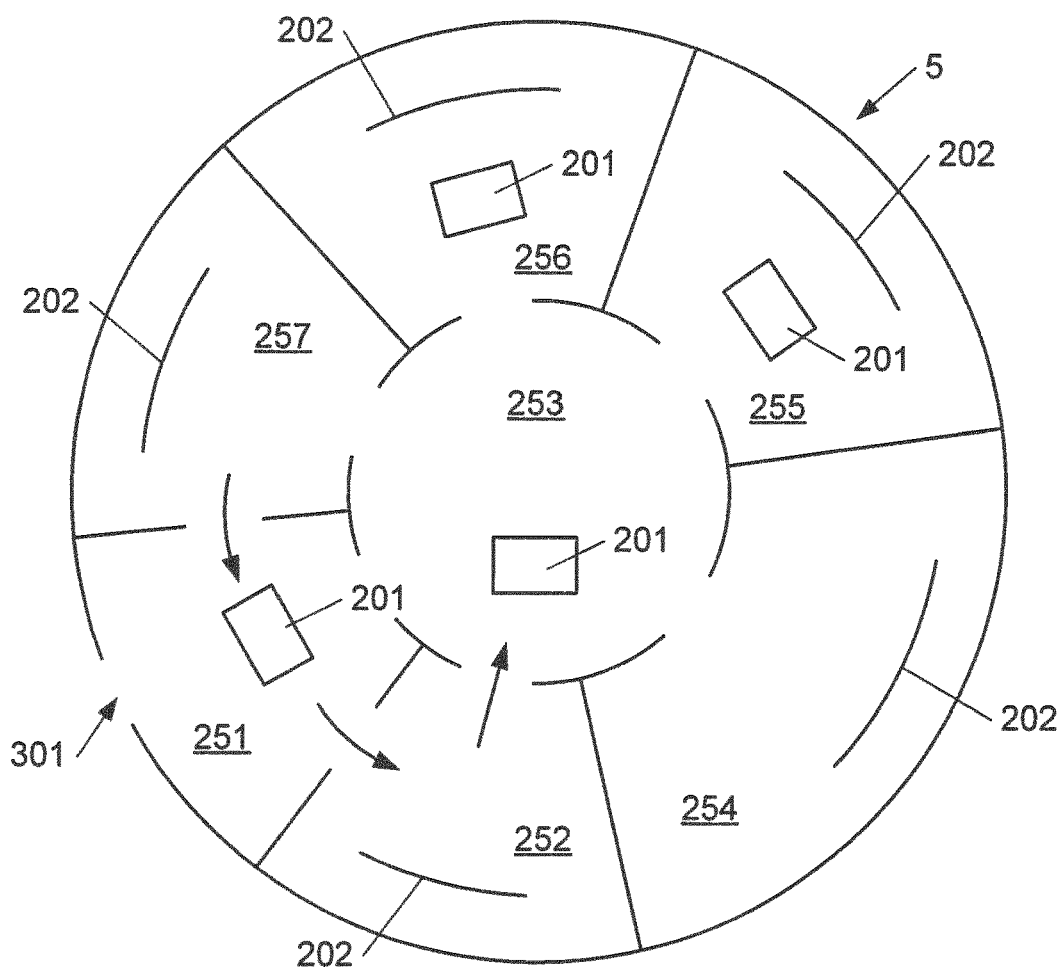

For a better understanding of the present invention, reference will now be made, by way of example, to the accompanying drawings in which:

FIG. 1 illustrates an electronic system according to an embodiment of the invention, FIG. 2 illustrates an embodiment of a method according to the invention for providing interactivity between an electronic system and a first user visiting a facility, FIG. 3 illustrates a possible use of various elements of an electronic system according to an embodiment of the invention, FIG. 4 illustrates another possible use of various elements of an electronic system according to an embodiment of the invention, FIG. 5 is a top view of a first embodiment of a facility including an electronic system according to the invention, and FIG. 6 is a top view of a second embodiment of a facility including an electronic system according to the invention.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

On the figures, identical or analogous elements may be referred by a same number.

FIG. 1 illustrates an electronic system 200 according to an embodiment of the invention. The electronic system 200 is interactive with a first user 1 visiting a facility 5. The facility 5 is preferably delimited by a physical barrier 51.

The electronic system 200 comprises a determination means 4, which preferably includes a determination software 40 and a memory 42. The determination software 40 may be stored in the memory 42. The determination software 40 is preferably executed by a computer comprised in the determination means 4. The determination software 40 preferably comprises a story software 41 and a dispatcher software 43. The determination means 4 may also comprise constraints 44 and a user historic database 45, for example stored in the memory 42.

The electronic system 200 comprises a first input mobile element 21, a first input fixed element 22 and a first output means 32. The electronic system 200 may also comprise a second input fixed element 23 and a second output means 33. In an embodiment of the invention, the first input fixed element 22 and the first output means 32 form a first station at a first target location and the second input fixed element 23 and the second output means 33 form a second station at a second target location.

During a first visit, when the first user 1 enters the facility 5 by crossing the physical barrier 51, he identifies himself and he is provided with the first input mobile element 21. The determination means 4 records the association of the first input mobile element 21 with the first user 1.

The first user 1, travelling with the first input mobile element 21, goes at the first station. There, the first input mobile element 21 interacts with the first input fixed element 22. This interaction is detected by the first input fixed element 22, which sends an information related to the first interaction to the determination means 4. Using the information related to the first interaction and possibly other information, the determination software 40 determines 107 a feedback information. Then, the determination means 4 sends 108 the feedback information to the first output means 32. The first output means 32 provides, to the first user 1 and/or the first input mobile element 21, a feedback that depends on the feedback information.

The feedback can for example be a video message for the first user 1 indicating him that he has to go a next target location which is the second station.

It is preferred that at least some information related to interactions caused by the first user 1 during his first visit is stored in the memory 42 when the first user 1 leaves the facility 5.

Preferably, a similar chain of steps happen when the first user 1 undertakes a second visit in the facility 5. During the second visit, it is preferred that, at least once, the feedback information is determined taking into account at least some information related to interactions caused by the first user 1 during his first visit.

Many users can visit the facility 5 at the same time and interact with the electronic system 200 in a similar way. Interaction of the first user may have an influence to the feedback provided to a second user if the first and the second user are at the same station or even if they are at different stations.

FIG. 2 illustrates an embodiment of a method 100 according to the invention for providing interactivity between the electronic system 200 and the first user 1 visiting the facility 5.

At step 101, the first user 1 enters the facility 5.

At step 102, the first user 1 is identified.

At step 103, the first input mobile element 21 is associated 103 with the first user 1 and this association is stored in the memory 42.

At step 104, the first input mobile element 21 interacts with the first input fixed element 22. This interaction is preferable purposively realized by the first user using the first input mobile element 21.

At step 105, this interaction is detected by the first input fixed element 22. Steps 104 and 105 may actually be joined, for example if the interaction is the detection itself.

At step 106, the first input fixed element 22 sends an information related to the first interaction to the determination means 4. This information is based on the detection 105.

At step 107, the determination so are 40 determines a feedback information based at least on the information related to the first interaction.

At step 108, the determination means 4 sends the feedback information to the first output means 32.

At step 109, the first output means 32 provides a feedback based on the feedback information.

Steps 104 to 109 can then be repeated with the same first input fixed element 22 and first output means 32 or for example with the second input fixed element 23 and second output means 33 (FIG. 1).

At step 110, the first user 1 leaves the facility 5. For example, he can hand over the first input mobile element 21. The departure of the first user 1 is preferably recorded in the memory 42.

Steps 101 to 110 are repeated during the second visit of the first user 1, possibly with other input mobile element, input fixed element and/or output means.

Each of steps 101 to 110 may involve a storage of information in the memory 42. Preferably, at least one information stored during the first visit of the first user 41 in the facility 5 is used at step 107 of the second visit of the first user 1.

The first user 1 may choose a profile, preferably at any of steps 101, 102 and 103. The profile corresponds to a data set in the memory 42 and data from this data set may be used at step 107 for the determination of the feedback information. For example, if the first user 1 choose the profile of a wizard, his input mobile element 21 may look like a magic wand, his interaction may be to perform a gesture with the magic wand and the feedback may be related to a spell supposed to be sent by this gesture.

In an embodiment of the invention, the determination of the feedback information 107 takes into account a timing.

In an embodiment of the invention, the determination of the feedback information 107 takes into account some constraints 44.

In an embodiment of the invention, the determination of the feedback information 107 takes into account the current location of the first user 1.

In an embodiment of the invention, the determination of the feedback information 107 determines a target location for the first user 1. For example, the target location may be determined in such a way that the distance between the current location and the target location is below a given threshold.

FIG. 3 illustrates a possible use of various elements of an electronic system 200 according to an embodiment of the invention.

The first user 1 uses his first input mobile element 21 to interact with the first input fixed element 22. The interaction triggers the sending of information related to the story software 41. The interaction also triggers a recognition 49 of the first user 1 and a call of the historic database 45 of the first user 1. The story software 41 uses the information related to the interaction, information related to the recognition and information related to the historic data. The story software 41 may call the dispatcher software 43 which determines the next target location. The dispatcher software 43 may take into account constraints 44 to determine the next target location.

The story software 41 uses the information related to the interaction, information related to the recognition, information related to the historic data and the information received from the dispatcher software 43 to determine the feedback information. Then, the feedback information is sent to the first output means 32 and provided to the first user 1 and/or to the first input mobile element 21.

FIG. 4 illustrates another possible use of various elements of an electronic system 200 according to an embodiment of the invention.

The first user 1 enters 101 the facility 5. He is identified 102, associated with the first input mobile element 21 and he interacts 104 with the first input fixed element 22. This interaction is detected 105 and the information related to the first interaction is sent 106 to the story software 41. The story software 41 lists 111 the possible target locations.

The story software 41 may ask 121 information about the user history at the user historic database 45. The user historic data are checked 112 and information about the user history are provided 122 to the story software 41.

The story software 41 may send 123 a list of possible target locations to the dispatcher software 43. The dispatcher software 43 determines the possible target locations in the list that fulfill all the constraints 44 by calling 124 the constraints 44. A response to this call is determined 114 and sent 125 to the dispatcher software 43. Then, the dispatcher software 43 provides a unique target location to the story software 41. The story software 41 determines the feedback information in such a way that the feedback information includes this unique target location, and sends 108 it to the first output means 32. The first output means 32 determines 115 the feedback that includes information about the unique target location and provides 127 it to the user 1. The user 1 then goes 128 to this target location wherein a similar process is repeated.

FIG. 5 is a top view of a first embodiment of a facility 5 including an electronic system 200 according to the invention.

The facility 5 comprises a series of spaces 52, 53, 54, 55, 56. Spaces are delimited by walls in such a way that a space is a room. The central space 53, which includes a dispatching station formed by a second input fixed element 23 and a second output means 33, may be called a dispatching space. The peripheral spaces 52, 54, 55, 56, which include an input fixed element 22, 24, 25, 26 and an output fixed element 32, 34, 35, 36, may be called the additional spaces. Each additional space 52, 54, 55, 56 is a possible target location. Each additional space 52, 54, 55, 56 may comprise a plurality of station, each station being formed by an input fixed element coupled to an output fixed element.

A visit in the facility 5 start before an entrance 57 through the wall 51 around the facility 5 when an electronic magic wand that forms the first input mobile element 21 is given to a first user 1 before he enters the facility 5. The name of the first user 1 is recorded at the same time in the memory 42 in order to identify the first user 1 and to associate 103 him with the first input mobile element 21.

The first user 1 enters the dispatching space 53. There, he logs in, which includes an interaction between the first input mobile element 21 and the second input fixed element 23. Based on the interaction, the determination software 40 determines the feedback information and the second output means 33 displays a video explaining to the first user 1 his mission and to which target location he has to go. The first user 1 can for example be sent to space 52.

He goes there and logs in, which includes an interaction between the first input mobile element 21 and the first input fixed element 22. There, the first output means 32 shows the position of the first input mobile element 21 thanks to a motion gesture recognition device included in the first input fixed element 22. The first player 1 can interact in various way with the first input fixed element 22 and get an immediate feedback from the first output means 32. After a duration, the first output means 32 indicates to the first user 1 that he has to go back to the dispatching space 53. In an embodiment of the invention, the duration is determined by the determination software 40 is such a way that it is shorter if the queue at the entrance of the facility is long.

He goes to the dispatching space 53 and logs in with his first input mobile element 21 on the second input fixed element 23. The determination software 40 takes into account the interactions he had with the first input fixed element 22 to choose the feedback information and the next target location. The determination software 40 may also take into account interactions of a second user with the first input fixed element 22 or with any other input fixed element 23, 24, 25, 26 to determine the feedback information.

The interactions of the first user 1 in spaces, for example several additional spaces may be taken into account in the determination of the feedback.

Preferably, the next target location is chosen in such a way that:
- the next target location is one of the additional spaces 52, 54, 55, 56 which is not closed,
- each additional space 52, 54, 55, 56 is visited by the first user 1,
- each additional space 52, 54, 55, 56 is visited only once by the first user 1 during each of his visits,
- additional spaces 52, 54, 55, 56 are visited in a different order during the first and the second visits of the first user 1 at the facility 5,
- there is at maximum X users in each additional spaces 52, 54, 55, 56, X being the number of stations in the additional space, and the users are as uniformly as possible distributed amongst the additional spaces 52, 54, 55, 56.

A possible other constraint is that the last additional space 52, 54, 55, 56 visited by the first user 1 is the exit space 56 which has an exit 58.

Once the first user 1 has visited the exit space 56, he leaves the facility 5 and hands over his first input mobile element 21. The first input mobile element 21 is then dissociated from the first user 1 and can be given to another user.

Preferably, if the first user 1 comes back, he will be identified, the same or another first input mobile element 21 will be given to him and this new input mobile element 21 will be associated with him.

FIG. 6 is a top view of a second embodiment of a facility 5 including an electronic system 200 according to the invention.

The facility 5 is a dark ride. It comprises a series of spaces 251, 252, 253, 254, 255, 256, 257. Spaces are delimited by walls in such a way that a space is a room.

The central space 253 may be called a dispatching space. The peripheral spaces 252, 254, 255, 256, 257 may be called the additional spaces. Preferably, there is a direct communication between each peripheral space 252, 254, 255, 256, 257 and the central space 253. Space 251 may be called the entrance space. Preferably, each of the central space 253 and the peripheral spaces 252, 254, 255, 256, 257 includes an input fixed element and an output means. Preferably, each peripheral space 252, 254, 255, 256, 257 is a possible target location.

The input mobile element comprises a vehicle 201 that carries a plurality of users. The vehicle 201 is equipped with one gun per user. Each gun forms therefore also an input mobile element.

Preferably, each input fixed element comprises a location system able to detect the position of the vehicle 201 and a plurality of sensors able to detect the shoots of the guns. The electronic system is preferable able to relate a shoot to a given gun.

The interactions between the vehicle 201 and the location system relate to the position of the vehicle 201, and the information related to this interaction preferably comprises the location of the vehicle 201.

The interactions between the guns and the sensors relate to shoot and the information related to this interaction may comprise an identification of a shot target and an identification of the gun.

The output means in the peripheral space 252, 254, 255, 256, 257 comprises preferably displays 202 and at least part of a vehicle motion system able to move the vehicles.

After entrance 301 in the facility 5, in the entrance space 251, each user is identified and associated with a gun and a vehicle.

The vehicle 201 moves then to a first space 252 where users can shoot on targets appearing on the display 202. Preferably, if the target is touched, an effect appears on the display 202.

Then, the vehicle 201 moves to the central space 253. The detection of the vehicle 201 in the central space 253 is an interaction that is sent by the location system of the central space 253 to the determination means 4. The determination software 40 determines the feedback information that includes the next target location. This determination may be based on the shooting performed in the first space 252. Then, the vehicle is sent, due the feedback information received by the vehicle motion system, to another 252, 254, 255, 256, 257. There, the users can shoot on the display 202, and are then sent back to the central space 253. The users are finally sent to the exit space 257 and back to the entrance space 251 where they leave the facility 5.

The determination of the feedback information may be based on at least one the following:
  shooting performed in peripheral spaces 252, 254, 255, 256, 257 already visited
  information collected during a previous visit of the facility 5 by a user in the vehicle,
  shooting score or position related to another vehicle currently present in the facility 5,
  size of the queue at the entrance of the facility 5,
  closure of one of the peripheral spaces 252, 254, 255, 256, 257, density of vehicles in the peripheral spaces 252, 254, 255, 256, 257, and
  peripheral spaces 252, 254, 255, 256 already visited by the vehicle 201 during this visit or by any user of the vehicle 201 during a previous visit.

In other words, the invention relates to a method for providing interactivity between an electronic system 200 and a first user 1 visiting a facility 5. The first user 1 is identified and provided with a first input mobile element 21. The first input mobile element 21 interacts with input fixed elements 22, 23. The interaction results in a feedback that is provided, through output means 32, 33, to the first user 1 or his first input mobile element 21. The feedback is preferably determined according to the history of the first user 1.

Although the present invention has been described above with respect to particular embodiments, it will readily be appreciated that other embodiments are also possible.

The invention claimed is:

1. A method for providing interactivity between an electronic system and a first user visiting a facility, and comprising:
  providing a first input fixed element in the facility,
  providing a first output means in the facility,
  providing a determination means comprising a determination software and a memory,
  wherein:
    a first input mobile element is associated with the first user, the first input mobile element being able to move with the first user,
    the first input fixed element detects a first interaction between the first input mobile element and the first input fixed element,
    the first input fixed element sends an information related to the first interaction to the determination means,
    the determination software determines a feedback information based on the information related to the first interaction,
    the determination means sends the feedback information to the first output means, and
    the first output means provides a feedback based on the feedback information,
    wherein a second user visits the facility and is associated with a second input mobile element able to move with him and wherein:
    the first input fixed element detects a second interaction between the second input mobile element and the first input fixed element,
    the first input fixed element sends an information related to the second interaction to the determination means,
    the determination software determines the feedback information based also on the information related to the second interaction, and the determination means sends the feedback information to the first output means, in such a way that the first output means influences the experience of the first user in the facility based on the second interaction due to the second user wherein the first user is identified during each of his visits of the facility, the memory stores the information related to the first interaction detected during the first visit and the feedback information determined during the second visit is based on the information related to the first interaction detected during the first visit.

2. The method of claim 1, wherein the feedback information is also determined based on a size of a queue at entrance of the facility.

3. The method of claim 1, wherein the first input fixed element and the first output means are comprised in a first station and further comprising the step of providing a second station comprising a second input fixed element and a second output means and further comprising the steps of the second input fixed element detects a subsequent interaction between the first input mobile element and the second input fixed element, and sends an information related to the subsequent interaction to the determination means, the determination software determines a second feedback information based on the information related to the first interaction and on the information related to the subsequent interaction, the determination means sends the second feedback information to the second output means, and the second output means provides a second feedback based on the second feedback information.

4. The method of claim 3, wherein the second feedback information comprises information about a target location and wherein the second feedback information relates at least partially to the target location.

5. The method of claim 1, wherein the first user chooses a profile and wherein the feedback information is based on the profile.

6. The method of claim 1, wherein the determination software determines a target location and the feedback information relates at least partially to the target location.

7. The method of claim 6, wherein the determination means stores a closure information indicating the closure of a possible target location and wherein the determination software determines the target location based on the closure information, in such a way that the target location differs from the closed possible target location.

8. The method of claim 6, wherein the determination software determines the target location in order to distribute the users within the facility.

9. The method of claim 6, wherein the determination software determines the target location based on previous target locations, in such a way that each target location is visited by a user only once, only once in a predetermined duration, or only once per visit of the facility.

10. The method of claim 6, wherein the determination software determines the target location based on the current location, in such a way that the distance between the current location and the target location is below a given threshold.

11. The method of claim 1, wherein the determination software determines the feedback information based also on a timing.

12. The method of claim 1, wherein the determination software determines the feedback information based also on a constraint.

13. The method of claim 1, wherein the first input mobile element comprises a vehicle that vehicles the first user within the facility.

14. The method of claim 1, wherein the first input mobile element further comprises a device actionable by the first user.

15. The method of claim 1, wherein the facility comprises a dispatching space and a plurality of additional spaces; and wherein the determination software determines a target location in such a way that at least one of the following conditions is fulfilled:

the target location is one of the additional spaces, during a visit, all the additional spaces are visited by the first user, during a visit, none of the additional spaces is visited more than once by the first user, there is at maximum a given number of input mobile elements in each of the additional spaces, and the additional spaces are visited in different order during the first and the second visits of the first user.

16. The method of claim 1, wherein the first user is identified during each of his visits of the facility, the memory stores the information related to the first interaction detected during the first visit and the feedback information determined during the second visit is based on the information related to the first interaction detected during the first visit.

17. An electronic system comprising:

a first input fixed element, a first output means, a determination means comprising a determination software, and a memory, a first input mobile element, and a second input mobile element, configured for carrying out a method for providing interactivity between the electronic system and a first user visiting a facility, wherein:

the first input mobile element is associated with the first user, the first input mobile element being able to move with the first user, the second input mobile element is associated with a second user, the second input mobile element being able to move with the second user, the first input fixed element detects a first interaction between the first input mobile element and the first input fixed element, the first input fixed element sends an information related to the first interaction to the determination means, the second input fixed element detects a second interaction between the second input mobile element and the first input fixed element, the first input fixed element sends an information related to the second interaction to the determination means, the determination software determines a feedback information based on the information related to the first interaction and on the information related to the second interaction, the determination means sends the feedback information to the first output means, and the first output means provides a feedback based on the feedback information.

18. A non-transitory computer-readable medium having stored thereon a computer program comprising instructions to cause an electronic system comprising a first input fixed element, a first output means, a determination means comprising a determination software and a memory, a first input mobile element, and a second input mobile element, to execute a method for providing interactivity between the electronic system and a first user visiting a facility, wherein:

the first input mobile element is associated with the first user, the first input mobile element being able to move with the first user, the second input mobile element is associated with a second user, the second input mobile element being able to move with the second user, the first input fixed element detects a first interaction between the first input mobile element and the first input fixed element, the first input fixed element sends an information related to the first interaction to the determination means, the second input fixed element detects a second interaction between the second input mobile element and the first input fixed element, the first input fixed element sends an information related to the second interaction to the determination means, the determination software determines a feedback information based on the information related to the first interaction and on the information related to the second interaction, the determination means sends the feedback information to the first output means, and the first output means provides a feedback based on the feedback information.

\* \* \* \* \*